Jan. 31, 1933.  F. W. B. SCHORADT  1,895,838

INDICATOR

Filed Feb. 7, 1931

INVENTOR
*Frederick W. B. Schoradt,*
BY
*F. B. Smith*
ATTORNEY

Patented Jan. 31, 1933

1,895,838

UNITED STATES PATENT OFFICE

FREDERICK W. B. SCHORADT, OF NEW YORK, N. Y., ASSIGNOR TO CHAS. CORY CORPORATION, OF NEW YORK, N. Y., A CORPORATION OF NEW YORK

INDICATOR

Application filed February 7, 1931. Serial No. 514,294.

This invention relates to indicators, and particularly to means for indicating varying degrees of movement at a distance.

In the concrete exemplification of the invention herein illustrated, the object whose movements are to be indicated is referred to as a rudder or steering member of a vessel, and the device on which indications are displayed is represented as a rudder indicating dial located on the vessel at a distance from the rudder; but it is to be understood that the invention is readily applicable to other uses; in fact, to any installation wherein it is desired to indicate the position and changes in position of a movable member.

An object of the invention is to provide novel motion translating connections between the member whose movements are to be indicated, and the indicating member.

Another object of the invention is to provide novel mechanical motion translating mechanism embodying a plurality of linkages which are alternately effective upon the indicating member.

A further object of the invention is to provide novel transmitting means whereby equal movements of the indicated member will produce unequal movements of the indicating member in accordance with a predetermined plan, so that for a certain stage or stages of the movement of the indicated member relatively small changes in position will be more readily discernible on the dial or scale associated with the indicating member than will be the case during the other stages of movement.

A further object of the invention is to provide novel means of the foregoing character wherein the variable ratio transmitting means comprises a combination of gear and link mechanisms, so disposed that one is automatically rendered effective upon the indicating member at the moment the other is rendered ineffective.

A further object of the invention is to provide an indicating mechanism of the foregoing character which shall be simple, reliable, positive and accurate in operation, inexpensive to manufacture and easy to install and adjust.

Other objects and advantages to be derived from the use of the novel mechanism disclosed herein reside in the construction and disposition of parts and will become apparent on inspection of the following description with reference to the accompanying drawing showing the preferred embodiment of the invention. It is to be understood, however, that said drawing is for the purpose of illustration only, and are not to be construed as a definition of the limits of the invention, reference being had to the appended claims for this purpose.

In the drawing, wherein like reference characters refer to like parts throughout the several views.

In the drawing.

Figure 1:
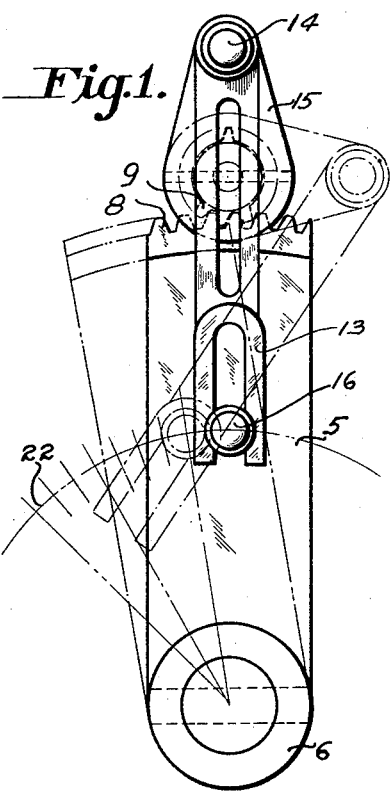
Fig. 1 is a view in vertical elevation of a device embodying the invention.

Reference character 1 designates a member whose movements are to be indicated, in the present case assumed to be the shaft of a ship's rudder. Reference character 2 is used to designate the indicating member or pointer by the movement of which the changing positions of the shaft 1 are to be indicated.

When the mechanism is installed on a ship, it will usually be found preferable to mount the pointer member 2 upon a suitable dial 3 in a location remote from the rudder of the ship, using suitable remote control means for transmitting the angular movement of the shaft 1 to the shaft on which the pointer 2 is mounted. Such remote control means may take any suitable or conventional form, such, for example, as that indicated in Fig. 4, and consisting of a pair of synchronous alternators having their fields interconnected, as shown, so that movement of the rotor shaft 11 generates a current causing corresponding movement of the shaft 4 of a motor placed at a distance from the shaft 11 and on which is mounted the pointer 2. It is apparent however that by the use of such remote control means, alone, it is possible to secure only equal and corresponding angular movements of the pointer 2 for each angular movement of the shaft 11. Since it is an object of the present invention to provide means whereby a relatively large motion increasing ratio is interposed between the rudder shaft 1 and the remote control mechanism during the first stages of the rudder movement so that relatively small variations in position, which are frequent during this stage of movement, may be magnified as they appear on the scale 3, the shaft 11 is provided with driving means such that a movement of one degree of the rudder shaft during this stage will produce a movement of ten degrees of the pointer shaft 4 and will therefore make it possible to readily discern the slightest change in position of the rudder.

Figure 2:
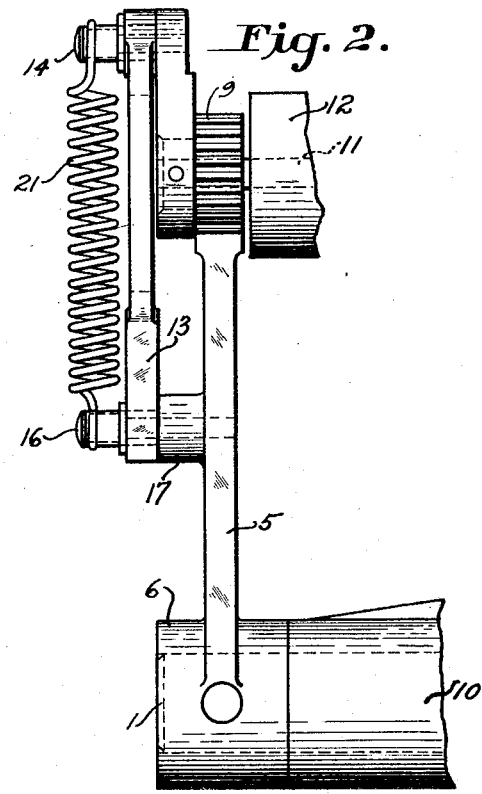
Fig. 2 is another view in elevation taken at right angles to the viewpoint of Fig. 1.
Figure 3:
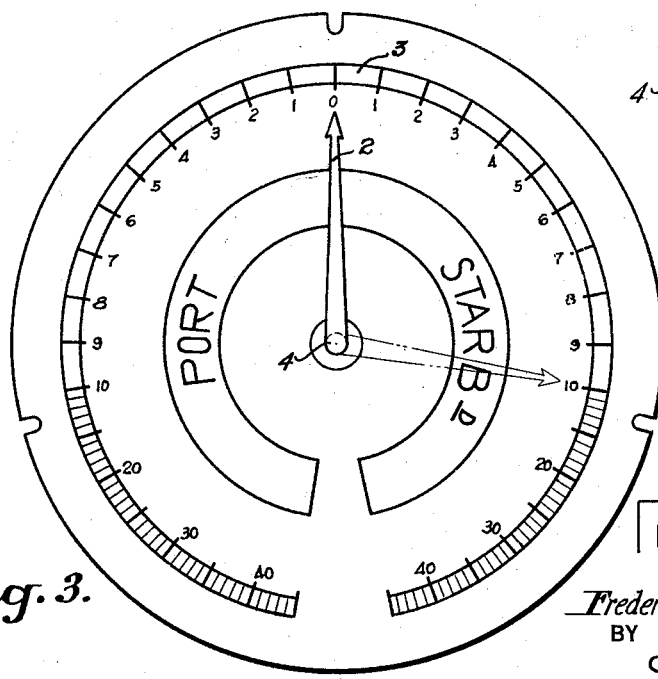
Fig. 3 is a view of the indicating member.
Figure 4:
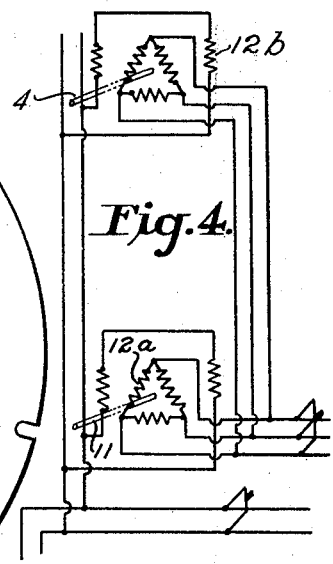
Fig. 4 is a schematic illustration of a suitable form of remote control means permitting installation of the indicating member at a distance.

The novel means employed for effecting these magnified movements of the indicating member while at the same time making it possible to indicate movements of the rudder through the entire range of a single dial, comprises a sector member 5 extending from a sleeve or bushing 6 secured to shaft 1 and provided at its outer edge with a set of teeth 8 adapted to mesh with teeth on gear 9 during movement of the shaft 1 through an arc of predetermined length, equivalent to ten degrees of angular movement. The gear 9 is in turn secured for rotation with the shaft 11 on which may be mounted the motor 12 having windings 12a or other suitable means for synchronous energization of a second motor or electrical member having windings 12b in synchronism therewith, as indicated in Fig. 4. With this arrangement it will be evident that during that stage of the movement of the shaft 1 during which the gear teeth of the sector 5 and gear 9 are in mesh, movement of the shaft 1 will cause corresponding movement of the shaft on the pointer 2, the degree of movement of the latter as compared with the degree of movement of the former depending upon the pitch radius of sector 5 as compared with the pitch radius of gear 9. In the illustration, this ratio is assumed to be ten to one, so that one degree of movement of the shaft 1 will produce ten degrees of movement of the pointer 2, but it is of course obvious that any suitable ratio may be employed. It is likewise obvious that the number of teeth on sector 5 may be varied to shorten or prolong the period of engagement of the said sector with the teeth of gear 9. In practice, however, it is usually found that after the first ten degrees of movement of the rudder it is not necessary to ascertain the exact amount of movement closer than within one degree of the amount thereof. As illustrated, therefore, means are provided for converting the ratio of transmission from a ten to one ratio to a much lower ratio, the moment that the rudder 10 has reached the corresponding point in its movement. As shown, such means comprises a link 13 pivotably secured at its upper end on a pin 14 on which is also pivotably mounted a second link or crank 15 connecting such pin with shaft 11, the lower end of link 13 being bifurcated to engage and retain the pin 16 extending outwardly through a lateral projection 17 secured to sector member 5, the arrangement being such that in the position of the parts shown in Figs. 1 and 2, the pin 17 occupies the position relative to the forked end of link 13 which is shown in full lines. Upon passage of the sector 5 to the left or right from this position, and resultant rotation of the gear 9 and gear shaft 11 and hence of the crank arm 16, it will be evident that the pin 14 and link 13 will be carried to the right or left, as the case may be, in an arc about shaft 11, and that such movement will cause a gradual telescoping action between the link 13 and pin 17 with the result that at the moment the sector is about to pass away from engagement with the teeth of gear 9, the fork and pin will have assumed the relative positions indicated in dash lines in Fig. 1, at which position the pin is firmly seated against the end of the recessed portion of the link, being held pressed thereagainst by the force of tension spring 21. It will be evident therefore that further movement of the shaft 1 will produce corresponding movement of the pin 17 along the arc indicated in Fig. 1 and this will in turn produce equivalent angular movement of the pin 14 along the arc indicated at 22 in Fig. 1, since the connection between the two pins is now the single link connection. It follows therefore that each succeeding angular movement of the shaft 1 will produce a corresponding angular movement of the shaft 11 about which the pin 14 rotates, except for a very slight deviation from a true mathematically constant ratio which results from the difference in the radius of curvature of the two arcs through which the pins 16 and 14, respectively, move. Such movements will be transmitted to the pointer shaft 2 by the synchronous means above referred to.

There is thus disclosed a mechanism having important features of novelty and advantage, and having the ability to automatically vary the ratio between the indicated member and the indicating members at a predetermined point in such movement and including the feature whereby it is possible to produce readily discernible indications of even the slightest degrees or fractions of degrees of movement of the indicated member and without the use of expensive or complicated indicating mechanisms.

While the embodiment shown is of considerable value from a practical viewpoint and is in all respects a thoroughly reliable and workable unit, it is of course expected that changes may be made in the form, shape and relative disposition of parts, but such changes are to be considered within the scope of the invention herein disclosed and sought to be protected. Thus, for example, it is intended that these Letters Patent shall protect the use of the mechanism in the form shown, or, when altered so as to substitute for the link construction shown at 13, a different form of ratio varying linkage such as a cam or eccentric working in relation to the gear members. Likewise a second set of gear members may be employed in place of the link operation.

Other objects and advantages to be derived from the use of the invention disclosed will become evident on an inspection of the following specification, with reference to the accompanying drawing illustrating one embodiment thereof. It is to be expressly understood, however, that the said drawing is for the purpose of illustration only and is not to be construed as a definition of the limits of the invention, reference being had to the appended claims for this purpose.

What is claimed is:

1. In combination with a rudder, a rudder indicating dial, a pointer associated with said dial, a shaft intermediate said rudder and pointer, a gear on said shaft, a member connected to said rudder and adapted to mesh with said gear during only a predetermined portion of movement of such rudder and means for maintaining an operative connection between said rudder and said intermediate shaft notwithstanding any movement of said last named member out of meshing engagement with said gear, said last named means comprising a link mechanism connecting said last named member with said intermediate shaft, said link mechanism being movable relatively to said rudder member, during meshing engagement with said gear, and adapted to form a rigid operative connection during the absence of said meshing engagement.

2. In combination with a rudder, a rudder indicating dial, a pointer associated with said dial, a shaft intermediate said rudder and pointer, a gear on said shaft, a member connected to said rudder and adapted to mesh with said gear during only a predetermined portion of movement of such rudder and means for maintaining an operative connection between said rudder and said intermediate shaft notwithstanding any movement of said last named member out of meshing engagement with said gear, said last named means comprising a link mechanism connecting said last named member with said intermediate shaft, said link mechanism being movable relatively to said rudder member, during meshing engagement with said gear, and adapted to form a rigid operative connection during the absence of said meshing engagement, and means for maintaining a tension on said link mechanism both during engagement and non-engagement with said gear.

3. In a device of the class described, in combination with a rudder, a shaft in which position and changes in position are indicated, a member for indicating such position and changes in position, a second shaft intermediate said first named shaft and said indicating member, a gear on said second named shaft, a sector on said first named shaft normally in engagement with said gear whereby movement of said first named shaft is communicated to said second named shaft, a link mechanism also drivably connecting said shaft, such link mechanism being ineffective as a driving connection until disengagement between said sector and gear.

4. In a device of the class described, in combination with a rudder, a shaft in which position and changes in position are indicated, a member for indicating such position and changes in position, a second shaft intermediate said first named shaft and said indicating member, a gear on said second shaft, a sector on said first named shaft normally in engagement with said gear whereby movements of said first named shaft is communicated to said second named shaft, and a link mechanism interposed between said sector and gear and movable relatively to said sector during such normal engagement between said sector and gear and means for producing a driving engagement between said sector and link mechanism as soon as said sector moves out of meshing engagement with said gear.

5. In combination, a driving member, a driven member, and means interposed between said members for imparting movements to the driven member of a predetermined ratio through a predetermined angular travel of the driving member and for imparting movements to said driven member of a different predetermined ratio when said driving member exceeds said predetermined angular travel, said means comprising a gear train through which the driven member is operated during said predetermined angular travel, and a link mechanism through which said driven member is operated when said driving member exceeds said predetermined angular travel.

6. In combination, a driving member, a driven member, and means interposed between said members for imparting movements to the driven member of a predetermined ratio through a predetermined angular travel of the driving member and for imparting movements to said driven member of a different predetermined ratio when said driving member exceeds said predetermined angular travel, said means comprising a plurality of motion-transmitting connections having different ratios, one of said connections being constituted by a gear train and the other by a link mechanism.

7. In combination, a driving member, a driven member, means including a dial and pointer relatively rotatable with respect to each other upon operation of said driven member by said driving member and associated with the driven member for indicating the angular positions of the driving member, and means interposed between said driving and driven members for causing relative rotation between the pointer and dial at one predetermined speed through a predetermined angle and at a different predetermined speed after said angle has been exceeded, said means comprising a gear train effective through said predetermined angle and a link mechanism effective after said angle has been exceeded.

8. In combination, a driving member, a driven member, means including a dial and pointer relatively rotatable with respect to each other upon operation of said driven member by said driving member and associated with the driven member for indicating the angular positions of the driving member, and means interposed between said driving and driven members for causing relative rotation between the pointer and dial at one predetermined speed through a predetermined angle and at a different predetermined speed after said angle has been exceeded, said last mentioned means including a plurality of motion-transmitting connections having different ratios, one of said connections being constituted by a gear train and the other by a link mechanism.

9. The combination with a rotatable member and means for indicating the angular position of said member, of means operated by said member for actuating said indicating means in increments having one ratio to the angular increments of motion of the rotatable member for a predetermined angular travel thereof and in increments having another ratio to the angular increments of motion of said member after the predetermined angular travel has been exceeded, said means comprising a gear train and a link mechanism connecting the rotatable member with said indicating means.

In testimony whereof I have signed this specification.

FREDERICK W. B. SCHORADT.